US007856009B2

(12) United States Patent
Azuma

(10) Patent No.: US 7,856,009 B2
(45) Date of Patent: Dec. 21, 2010

(54) VOIP GATEWAY APPARATUS

(75) Inventor: Kazumasa Azuma, Koriyama (JP)

(73) Assignee: Hitachi, Ltd., Tokyo (JP)

( * ) Notice: Subject to any disclaimer, the term of this patent is extended or adjusted under 35 U.S.C. 154(b) by 1164 days.

(21) Appl. No.: 11/214,867

(22) Filed: Aug. 31, 2005

(65) Prior Publication Data
US 2006/0182089 A1    Aug. 17, 2006

(30) Foreign Application Priority Data
Feb. 15, 2005    (JP)    ............... 2005-037602

(51) Int. Cl.
*H04L 12/66*    (2006.01)
(52) U.S. Cl. ...................... 370/352; 370/354
(58) Field of Classification Search ......... 370/351–354; 379/93.07, 93.09; 455/445
See application file for complete search history.

(56) References Cited
U.S. PATENT DOCUMENTS
7,457,278 B2 *  11/2008  Son et al. ............... 370/351
2003/0227905 A1 *  12/2003  Bouleros et al. ......... 370/352
2004/0240430 A1 *  12/2004  Lin et al. ............... 370/352

FOREIGN PATENT DOCUMENTS
JP    2000-312229    11/2000
JP    2001-36641    2/2001
JP    2001-156881    6/2001
JP    2003-018182    1/2003
JP    2003-258998    9/2003
WO    WO 03/103259    12/2003

* cited by examiner

*Primary Examiner*—Ahmad F Matar
*Assistant Examiner*—Oleg Asanbayev
(74) *Attorney, Agent, or Firm*—Antonelli, Terry, Stout & Kraus, LLP.

(57) ABSTRACT

To allow a call received from an accommodated device to arrive at the other party by diverting the call from an IP network to a detour network even with different numbering systems between communications over the IP network and over the detour network. A VoIP gateway apparatus 1 includes an ISDN terminal side IF portion 101, an IP network side IF portion 102, an ISDN network side IF portion 103, a condition storage portion 109, a detour determining portion 108, and a number editing portion 106. The detour determining portion 108 determines whether a call arriving at the ISDN terminal side IF portion 101 satisfies a detour condition stored in the condition storage portion 109 or not. If so, the number editing portion 106 edits the called party number of the call under a number editing condition stored in the condition storage portion 109 and then transmits it from the ISDN network side IF portion 103. If not, the call is transmitted from the IP network side IF portion 102 without editing the called party number.

8 Claims, 7 Drawing Sheets

CONDITION STORAGE PORTION 109

| CALLED PARTY NUMBERS | DETOUR CONDITIONS | NUMBER EDITING CONDITIONS |
|---|---|---|
| 1∗∗ | Number Detour | No Editing |
| 71-∗∗∗ | Detour In Failure | Number Conversion<br>Specified Number: 06-1111-1111 |
| 72-∗∗∗ | Response Code Detour<br>Specified Code: ∗∗∗∗ | Slide-Calling Number Conversion<br>Specified Number 1: 06-2222-1111<br>Specified Number 2: 06-2222-1112<br>Specified Number 3: 06-2222-1113 |
| ⋮ | ⋮ | ⋮ |

1091, 1092, 1093, 1090

VOIP GATEWAY APPARATUS

BACKGROUND OF THE INVENTION

The present invention relates to a VoIP (Voice over Internet Protocol) gateway apparatus and, in particular, to a technology for diverting a call received from an accommodated device from an IP network to a detour network and a technology for relaying a call received from a detour network to an accommodated device.

Japanese Patent Laid-Open Publication No. 2000-312229 (hereinafter, referred to as Patent Document 1) discloses a technology for allowing the continuation of voice communication even when the quality of communication over the Internet is lowered. In Patent Document 1, a voice gateway apparatus includes an interface for controlling a call connection to a PSTN (Public Switched Telephone Network). When low quality in communication over the Internet is detected in this case, a call is connected to the other party over the PSTN, and voice communication with the other party is switched from voice communication over the Internet to voice communication over the PSTN.

Japanese Patent Laid-open Publication No. 2001-36641 (hereinafter, referred to as Patent Document 2) discloses a technology for connecting a call between telephone terminals over the Internet or a PSTN. In Patent Document 2, an exchange at the time of calling accesses a database which stores subscriber information such as the presence of subscriptions to an Internet Protocol telephone service by the caller and the receiver and the type or types of the telephone terminals, determines either the Internet or a PSTN is to be used for the connection based on the subscriber information obtained from the database based on the called party number dialed by the caller and subscriber information of the caller and implements call connection over the determined route.

DISCLOSURE OF THE INVENTION

Problems that the Invention is to Solve

According to the technologies disclosed in Patent Document 1 and Patent Document 2, a call intended for transmission on the Internet by a caller could be diverted to a PSTN. However, these technologies do not consider cases where the called party number of the call intended to be transmitted to the Internet by a caller is a telephone number in a numbering system that is unprocessable by a PSTN. When the receiver has different subscriber numbers between communications over the Internet and over the PSTN even if the called party number of the call is a telephone number in the numbering system processable by a PSTN, the call cannot arrive at the correct party if the call is diverted to the PSTN.

The present invention was made in view of these issues, and it is an object of the invention to allow a call received from an accommodated device to arrive at the other party by diverting the call from an IP network to a detour network even with different numbering systems between communications over an IP network and over the detour network. It is another object of the present invention to relay a call received from a detour network to an accommodated device such that the accommodated device can process the call

Means for Solving the Problems

In order to achieve the objects, according to a first aspect of the invention, when a call to an IP network is diverted to a detour network, the called party number of the call is being edited from the telephone number in the numbering system for the IP network to the telephone number in the numbering system for the detour network, and thereafter the call is being transmitted to the detour network.

For example, the first aspect of the invention is a VoIP gateway apparatus which connects a device accommodated therein to an IP network and a detour network, the apparatus including:

an accommodated device interface which connects to the accommodated device;

an IP network interface which connects to the IP network, a detour network interface which connects to the detour network;

a condition storage unit which stores a detour condition and a number editing condition; and a calling control unit which transmits a call arriving at the accommodated device interface from the IP network interface or the detour network interface, wherein the calling control unit;

when a call arriving at the accommodated device interface satisfies the detour condition stored in the condition storage unit, edits the called party number of the call under the number editing condition stored in the condition storage unit and transmits the call from the detour network interface; and when a call arriving at the accommodated device interface does not satisfy the detour condition stored in the condition storage unit, transmits the call from the IP network interface without editing the called party number of the call.

According to a second aspect of the invention, a call received from a detour network is relayed to an accommodated device after the called party number of the call is being edited from the telephone number in the numbering system of the detour network to the telephone number in the numbering system for the IP network defined in the accommodated device.

For example, the second aspect of the invention is a VoIP gateway apparatus which connects a device accommodated therein to an IP network and a detour network, the apparatus including:

an accommodated device interface which connects to the accommodated device;

an IP network interface which connects to the IP network;

a detour network interface which connects to the detour network; and a calling control unit which transmits a call arriving at the IP network and the detour network from the accommodated device interface, wherein the calling control unit:

when a call arrives at the IP network interface, transmits the call from the accommodated device interface without editing the called party number of the call; and when a call arrives at the detour network interface, changes the called party number of the call to a telephone number defined in the accommodated device and then transmits the call from the accommodated device interface.

Advantage of the Invention

According to the invention, a VoIP gateway apparatus performs number editing. A call to an IP network is diverted to a detour network after the called party number of the call is being edited from the telephone number in the numbering system for the IP network to the telephone number in the numbering system for the detour network. Furthermore, a call received from a detour network is relayed to an accommodated device after the called party number of the call is being edited from the telephone number in the numbering system of the detour network to the telephone number defined in the accommodated device. Thus, a call received from the accommodated device is allowed to arrive at the other party by diverting the call from the IP network to the detour network. Furthermore, the call received from the detour network can be relayed to the accommodated device such that the accommodated device can process the call.

BEST MODE FOR CARRYING OUT THE INVENTION

An embodiment of the present invention will be described below.

Figure 1:
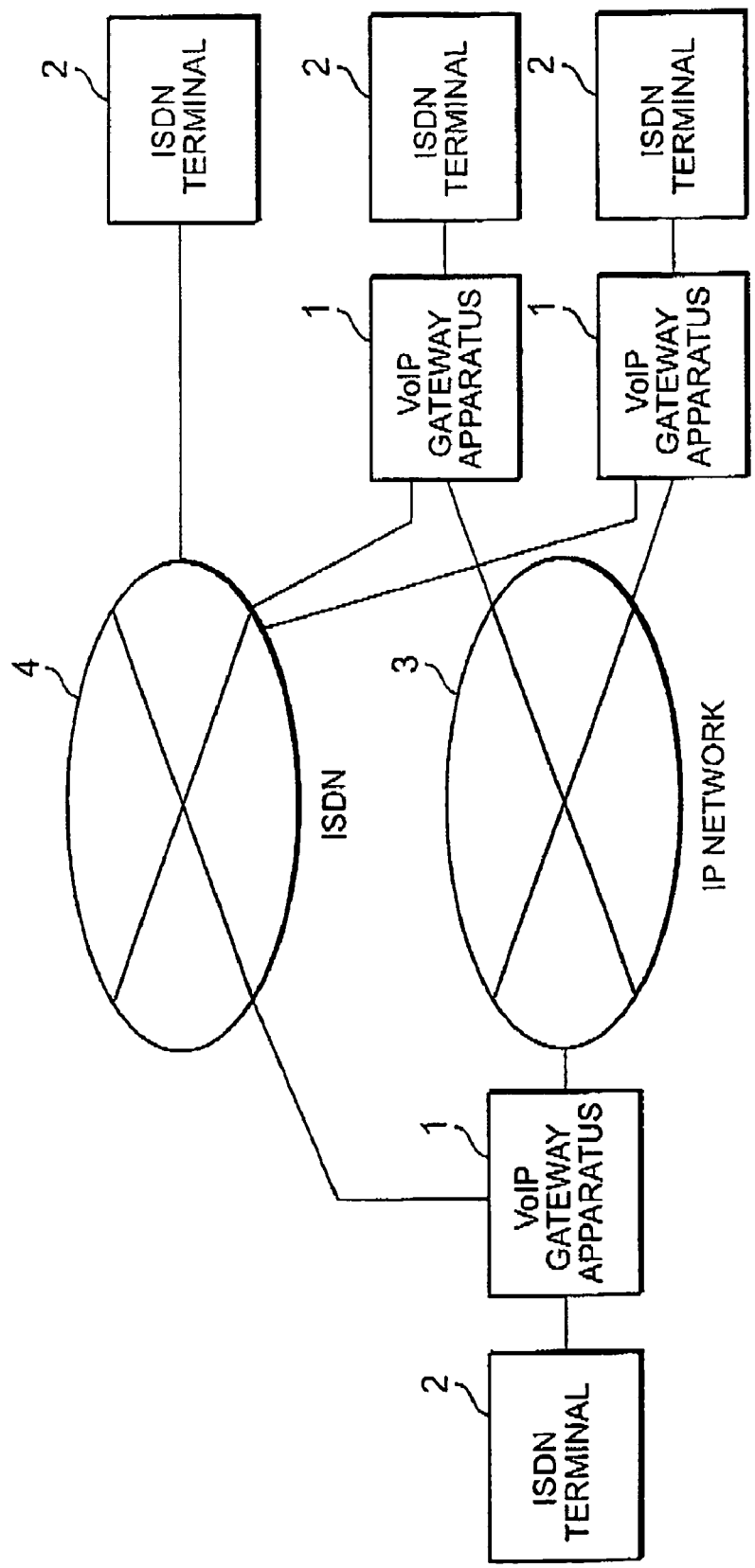
FIG. 1 is a schematic diagram of a VoIP communication system in which an embodiment of the invention is provided.

FIG. 1 is a schematic diagram of a VoIP communication system in which an embodiment of the invention is provided. As shown in FIG. 1, the VoIP communication system of this embodiment includes connections of multiple VoIP gateway apparatus 1 each accommodating an ISDN (Integrated Services Digital Network) terminal 2 such as a TA (terminal adapter), an ISDN-compliant PBX (Private Branch Exchange), FAX and telephone to an IP network 3 and an ISDN 4. In addition, ISDN 4 is one of the PSTN (Public Switched Telephone Networks). The VoIP communication system of this embodiment further includes an ISDN terminal 2 directly connected to the ISDN 4 without intervening the VoIP gateway apparatus 1.

Here, a subscriber's number (referred to as VoIP number) for an IP telephone service over the IP network 3 is given to the ISDN terminal 2 accommodated in the VoIP gateway apparatus 1 as the telephone number of the ISDN terminal 2. Furthermore, a subscriber's number (referred to as ISDN number) for a telephone service over the ISDN 4 is given to the ISDN terminal 2 directly connected to the ISDN 4 as the telephone number of the ISDN terminal 2. Furthermore, the VoIP number and ISDN number given to the ISDN terminal 2 accommodated in the VoIP gateway apparatus 1 are defined in the VoIP gateway apparatus 1.

The VoIP gateway apparatus 1 diverts, to the ISDN 4, a call to the IP network 3 received from the ISDN terminal 2 after editing the called party number of the call from the telephone number in the numbering system for the IP network 3 to the telephone number in the numbering system for the ISDN 4. Furthermore, a call received from the ISDN 4 is relayed to the ISDN terminal 2 accommodated in the VoIP gateway apparatus 1 after the called party number of the call is being edited from the telephone number in the numbering system for the ISDN 4 to the telephone number in the numbering system for the IP network 3.

Figure 2:
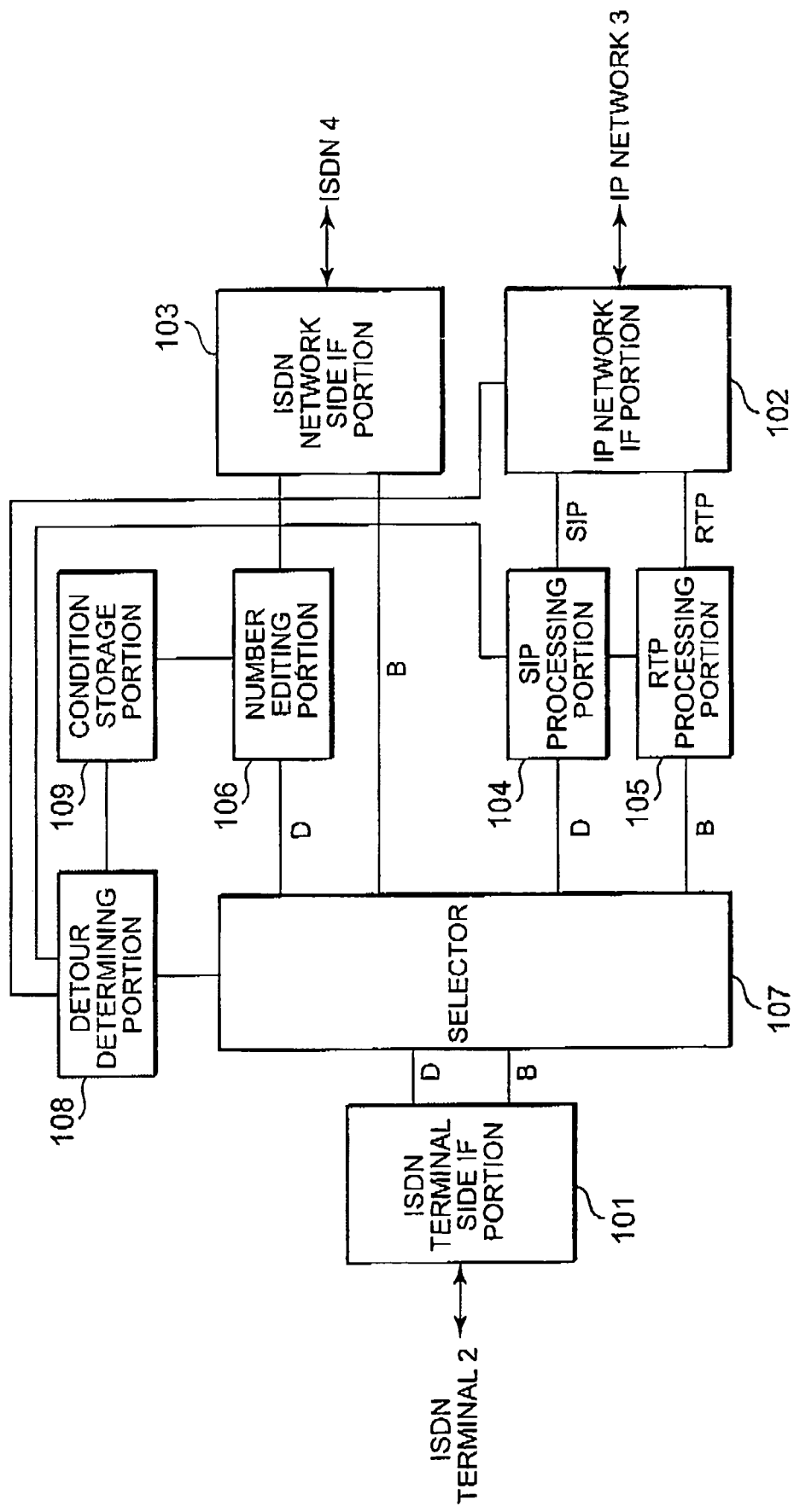
FIG. 2 is a schematic diagram of a VoIP gateway apparatus to which the embodiment of the invention is applied.

FIG. 2 is a schematic diagram of a VoIP gateway apparatus to which the embodiment of the invention is applied. As shown in FIG. 2, the VoIP gateway apparatus 1 of this embodiment includes an ISDN terminal side IF (interface) portion 101, an IP network IF portion 102, an ISDN network side IF portion 103, an SIP (Session Initiation Protocol) processing portion 104, an RTP (Real-time Transport Protocol) processing portion 105, a number editing portion 106, a selector 107, a detour determining portion 108 and a condition storage portion 109.

The ISDN terminal side IF portion 101 exchanges ISDN signals (D-channel and B-channel) with the ISDN terminal 2 via an ISDN line.

The IP network IF portion 102 exchanges IP packets (RTP packet and SIP packet) with the IP a network 3 over the Ethernet (registered trademark) for example.

The ISDN network side IF portion 103 exchanges ISDN signals (D-channel and B-channel) with the ISDN 4 via an ISDN line.

The SIP processing portion 104 performs VoIP call control steps provided in SIP and establishes a call to the other party (VoIP terminal) through the IP network IF portion 102. Then, the SIP processing portion 104 determines a B-channel for the call to the ISDN terminal 2, which is to be allocated to the call, and notifies the determined B-channel and the IP address of the VoIP terminal of the other party to the RTP processing portion 105.

The RTP processing portion 105 performs processing provided in RTP on the call signal that the ISDN terminal side IF portion 101 has received from the ISDN terminal 2 via the B-channel notified by the SIP processing portion 104 and on the RTP packet of the other party that the IP network IF portion 102 has received and has the IP address notified by the SIP processing portion 104.

More specifically, the RTP processing portion 105 RTP-packetizes the call signal that the ISDN terminal side IF portion 101 has received via the B-channel notified by the SIP processing portion 104 and transmits the RTP packet to the IP network IF portion 102 by using the IP address notified by the SIP processing portion 104 as the address. Furthermore, the call number is reproduced from the RTP packet that the IP network IF portion 102 has received and is called from the IP address notified by the SIP processing portion 104 and is transmitted to the B-channel notified by the SIP processing portion 104 through the ISDN terminal side IF portion 101.

Under a number editing condition stored in the condition storage portion 109, which will be described later, the number editing portion 106 edits a called party number (VoIP number) included in the call control information (D-channel) received from the ISDN terminal side IF portion 101 through the selector 107 and transfers the edited number to the ISDN network side IF portion 103. Under the number editing condition, the number editing portion 106 further edits the called party number (ISDN number) included in the call control information (D-channel) received from the IP network IF portion 101 and transfers the edited number to the ISDN network side IF portion 103 through the selector 107.

In accordance with a command from the detour determining portion 108, the selector 107 connects the D-channel and B-channel of the ISDN terminal side IF portion 101 to the SIP processing portion 104 and the RTP processing portion 105 or the number editing portion 106 and the ISDN network side IF portion 103.

Under a detour condition stored in the condition storage portion 109, which will be described later, the detour determining portion 108 determines whether the call arriving from the ISDN terminal 2 to the ISDN terminal side IF portion 101 is to be diverted or not. Based on the determination result, the detour determination portion 108 determines one of the IP network IF portion 102 and the ISDN network side IF portion 103 as the destination from the ISDN terminal side IF portion 101. When the IP network IF portion 102 is determined as the destination, the D-channel of the ISDN terminal side IF portion 101 is connected to the SIP processing portion 104, and the B-channel is connected to the RTP processing portion 105. When the ISDN network IF portion 103 is determined as the destination on the other hand, the D-channel of the ISDN terminal side IF portion 101 is connected to the number editing portion 106, and the B-channel is connected to the ISDN network side IF portion 103.

Figures 3, 4:
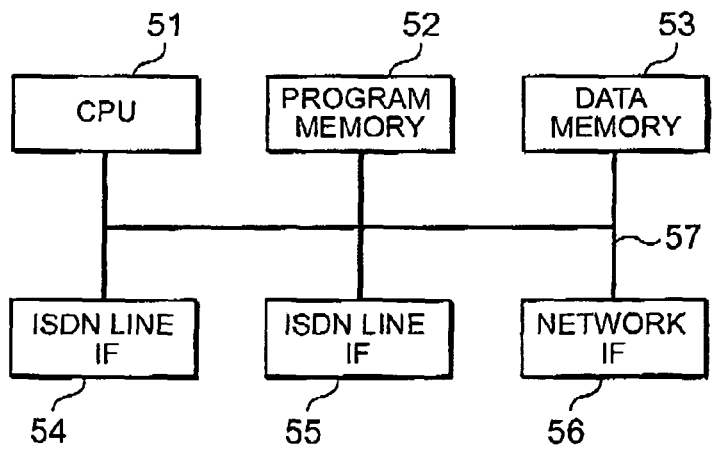
FIG. 3 is a diagram schematically showing a registered data example in a condition storage portion 109.
FIG. 4 is a diagram showing a hardware configuration example of a VoIP gateway apparatus 1.

The condition storage portion 109 stores a detour condition to be used for the detour determination by the detour determining portion 108 and a number editing condition to be used for the number editing by the number editing portion 106. FIG. 3 is a diagram schematically showing registered data in the condition storage portion 109. As shown in FIG. 3, a record 1090 of condition information includes a field 1091 having the called party number of a call arriving at the ISDN terminal side IF portion 101, a field 1092 having a detour condition for diverting a call from the IP network 3 to the ISDN 4, and a field 1093 having an editing condition for the called party number of a call to be diverted to the ISDN 4.

The called party number to be registered in the field 1091 may be a number with a higher digit or digits such as "1", "71-*" and "72-*" shown in FIG. 3, instead of the number with all digits. Here, "1" refers to a telephone number the called party number of which has three digits, starting from "1". "71-*" refers to a telephone number the called party number of which has five digits, starting from "71". "72-*" refers to a telephone number the called party number of which has five digits, starting from "72".

The detour conditions to be registered in the field 1092 may include "Number Detour", "Detour In Failure" and "Response Code Detour". Under "Number Detour", when a call with a called party number registered in the field 1091 arrives at the ISDN terminal side IF portion 101, the call is diverted to the ISDN 4 unconditionally. Under "Detour In Failure", the call is diverted to the ISDN 4 only when a failure occurs in the IP network 3. Under "Response Code Detour", the call is diverted to the ISDN 4 only when a specified response code is received from the IP network 3 as a response to the call.

The number editing conditions to be registered in the field 1093 may include "No Editing", "Number Conversion" and "Slide-Calling Number Conversion". Under "No Editing", a call is diverted to the ISDN 4 without editing the called party number registered in the field 1091. Under "Number Conversion", a call is diverted to the ISDN 4 after converting the called party number to a specified number. Under "Slide-Calling Number Conversion", a call is slid to the ISDN 4 after converting the called party number to one of multiple specified numbers. Here, the term, "Slide Calling", refers to a calling operation in which processing that a call is originated to one of multiple specified numbers and, if busy, the call is originated to another one of the multiple numbers is repeated until a number which is not busy is found or a call is originated to all specified numbers.

The VoIP gateway apparatus 1 may be implemented by executing, by a CPU 51, a program stored in a program memory 52 in a computer system including, as shown in FIG. 4, for example, the CPU 51, the program memory 52 storing the program and so on, a data memory 53 storing data, an ISDN line IF 54 which communicates with the ISDN terminal 2 via an ISDN cable, an ISDN line IF 55 which communicates with the ISDN 4 via an ISDN cable, a network IF 56 which communicates with the IP network 3 via a LAN cable and an internal bus 57 which mutually connects the components 51 to 56. In this case, the condition storage portion 109 may be the data memory 53. The ISDN terminal side IF portion 101 and ISDN network side IF portion 103 may be the ISDN line IF portions 54 and 55. The IP network IF portion 102 may be the network IF 56.

Next, an operation of the VoIP gateway apparatus 1 in this configuration will be described.

Figure 5:
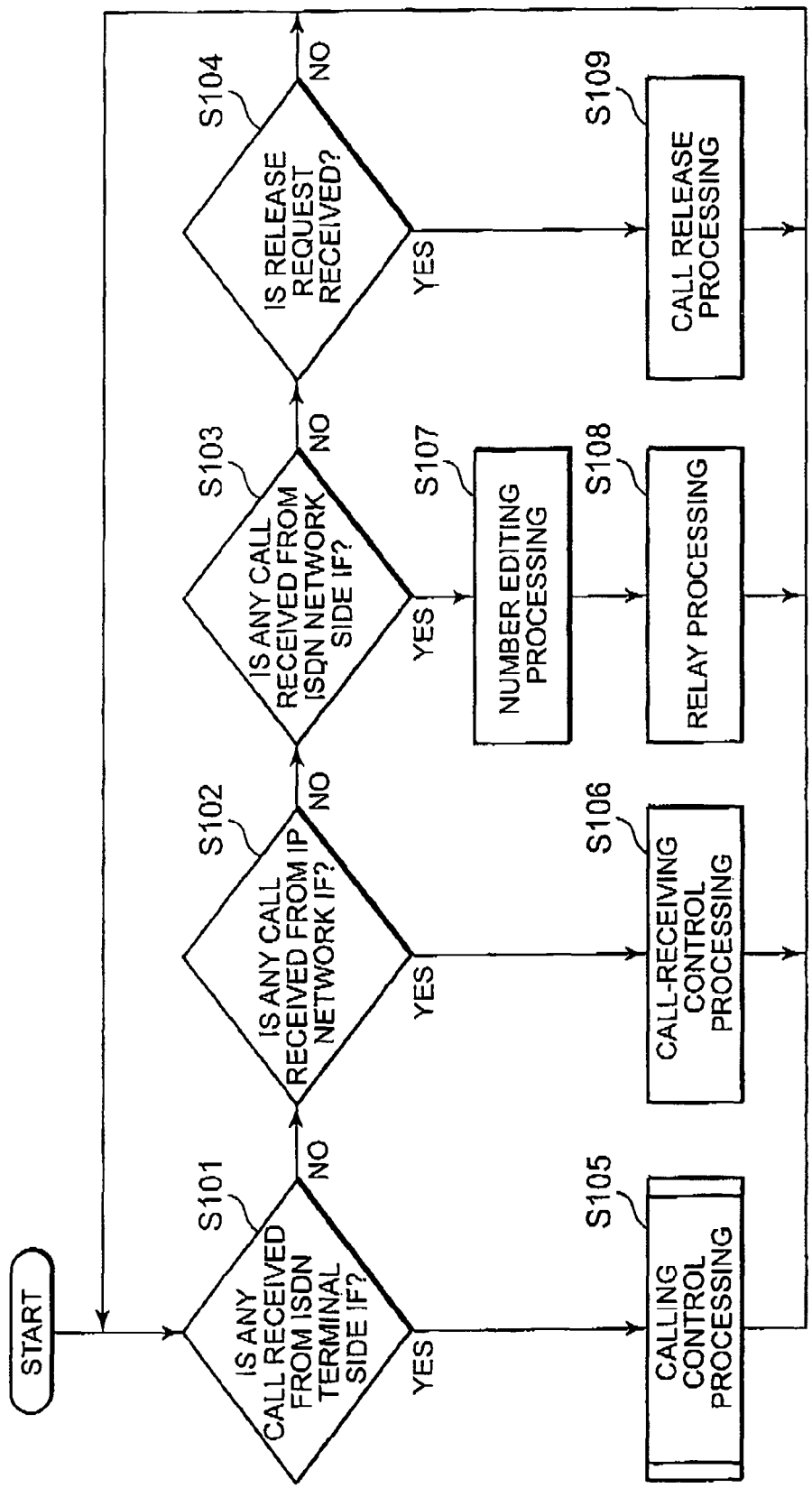
FIG. 5 is a flowchart for explaining call control processing in the VoIP gateway apparatus 1.

FIG. 5 is a flowchart for explaining call control processing by the VoIP gateway apparatus 1.

When the ISDN terminal side IF portion 101 receives a SETUP message from the ISDN terminal 2 via the ISDN D-channel (where the ISDN terminal 2 is the caller) (S101), the ISDN terminal side IF portion 101 starts calling control processing, which will be described later, in liaison with the other components in the VoIP gateway apparatus 1 (S105).

When the IP network IF portion 102 receives a SIP packet storing an INVITE message from the IP network 3 (where the ISDN terminal 2 is the receiver) (Yes in S102), the IP network IF portion 102 starts call-receiving control processing in liaison with the other components in the VoIP gateway apparatus 1 (S106).

More specifically, the SIP processing portion 104 notifies a connection command to the selector 107. In response thereto, the selector 107 connects the ISDN terminal side IF portion 101 and the SIP processing portion 104 such that a D-channel signal can be exchanged between them and connects the ISDN terminal side IF portion 101 and the RTP processing portion 105 such that a B-channel signal can be exchanged between them. Furthermore, the SIP processing portion 104 converts the INVITE message received from the IP network 3 through the IP network IF portion 102 to a SETUP message for the ISDN and outputs it to the ISDN terminal side IF portion 101. Then, the ISDN terminal side IF portion 101 stores the SETUP message received from the SIP processing portion 104 in the ISDN D-channel and transmits it to the ISDN terminal 2. Then, the SIP processing portion 104 performs processing of exchanging a call control message stored in the ISDN D-channel to be exchanged with the ISDN terminal 2 through the ISDN terminal side IF portion 101 and a call control message stored in the SIP packet to be exchanged with the IP network 3 through the IP network side IF portion 102 and establishes the call between the ISDN terminal 2 and the IP network 3.

Next, the SIP processing portion 104 requests the ISDN terminal side IF portion 101 for channel allocation. In response thereto, the ISDN terminal side IF portion 101 defines a B-channel to the ISDN terminal 2 to which the established call is allocated and notifies the defined B-channel to the SIP processing portion 104. The SIP processing portion 104 notifies the RTP processing portion 105 of the B-channel notified from the ISDN terminal side IF portion 101 and the IP address of the other party (VoIP terminal).

In response thereto, the RTP processing portion 105 stores, in an RTP packet, a call signal that the ISDN terminal side IF portion 101 has received via the B-channel notified by the SIP processing portion 104 and transmits the IP address notified by the SIP processing portion 104 from the IP network IF portion 102 to the IP network 3 as the address of the RTP packet. Furthermore, the RTP processing portion 105 extracts the call signal from the RTP packet received by the IP network IF portion 102 and having the IP address notified by the SIP processing portion 104, stores it in the B-channel notified by the SIP processing portion 104 and transmits it from the ISDN terminal side IF portion 101. Thus, the call is enabled.

When the ISDN network side IF portion 103 receives a SETUP message from the ISDN 4 via the ISDN D-channel (where the ISDN terminal 2 is the receiver) (YES in S103), the number editing portion 106 notifies a connection command to the selector 107. In response thereto, the selector 107 connects the ISDN terminal side IF portion 101 and the number editing portion 106 such that a D-channel signal can be exchanged between them and connects the ISDN terminal side IF portion 101 and the ISDN network side IF portion 103 such that a B-channel signal can be exchanged between them. Furthermore, the number editing portion 106 converts the called party number of the SETUP message received from the ISDN 4 to a telephone number specified by the called party subaddress of the SETUP message and transfers it to the ISDN terminal side IF portion 101 (S107). Then, the ISDN terminal side IF portion 101 stores the SETUP message received from the number editing portion 106 in the ISDN D-channel and transmits it to the ISDN terminal 2. Then, the number editing portion 106 relays the D-channel signal to be exchanged between the ISDN terminal side IF portion 101 and the ISDN network side IF portion 103 (S108). Thus, the call control processing is performed between the ISDN terminal 2 and the ISDN 4, and the call is established between them. Then, the B-channel signal is exchanged between the ISDN terminal side IF portion 101 and the ISDN network side IF portion 103. Thus, the call is enabled.

When the SIP processing portion 104 receives, from the ISDN terminal 2 through the ISDN terminal side IF portion 101, a RELEASE message for the call established to the IP network 3 (Yes in S104), the SIP processing portion 104 transmits an SIP packet storing the RELEASE message to the IP network 3 through the IP network IF portion 102 by using the IP address of the other party of the call as the address. Then, the SIP processing portion 104 performs processing of exchanging a call control message stored in the ISDN D-channel to be exchanged with the ISDN terminal 2 through the ISDN terminal side IF portion 101 and a call control message stored in an SIP packet to be exchanged with the IP network 3 through the IP network side IF portion 102 and releases the call (S109).

Similarly, when the SIP processing portion 104 receives, from the IP network 3 through the ISDN network side IF portion 102, an SIP packet storing a RELEASE message for the call established to the ISDN terminal 2 (Yes in S104), the SIP processing portion 104 stores the RELEASE message in the ISDN D-channel and transmits the message to the ISDN terminal 2 through the ISDN terminal side IF portion 101. Then, the SIP processing portion 104 performs processing of exchanging a call control message stored in the ISDN D-channel to be exchanged with the ISDN terminal 2 through the ISDN terminal side IF portion 101 and a call control message stored in an SIP packet to be exchanged with the IP network 3 through the IP network side IF portion 102 and releases the call established between the ISDN terminal 2 and the IP network 3 (S109).

When the SIP processing portion 104 receives, from the ISDN terminal 2 through the ISDN terminal side IF portion 101, a RELEASE message for the call established to the ISDN 4 (Yes in S104), the SIP processing portion 104 transmits the RELEASE message to the ISDN 4 through the ISDN network side IF portion 103. Then, the SIP processing portion 104 performs processing of exchanging a call control message between the ISDN terminal 2 and the ISDN 4 through the ISDN terminal side IF portion 101 and the ISDN network side IF portion 103. Thus, the call established between the ISDN terminal 2 and the ISDN 4 is released (S109).

Figure 6:
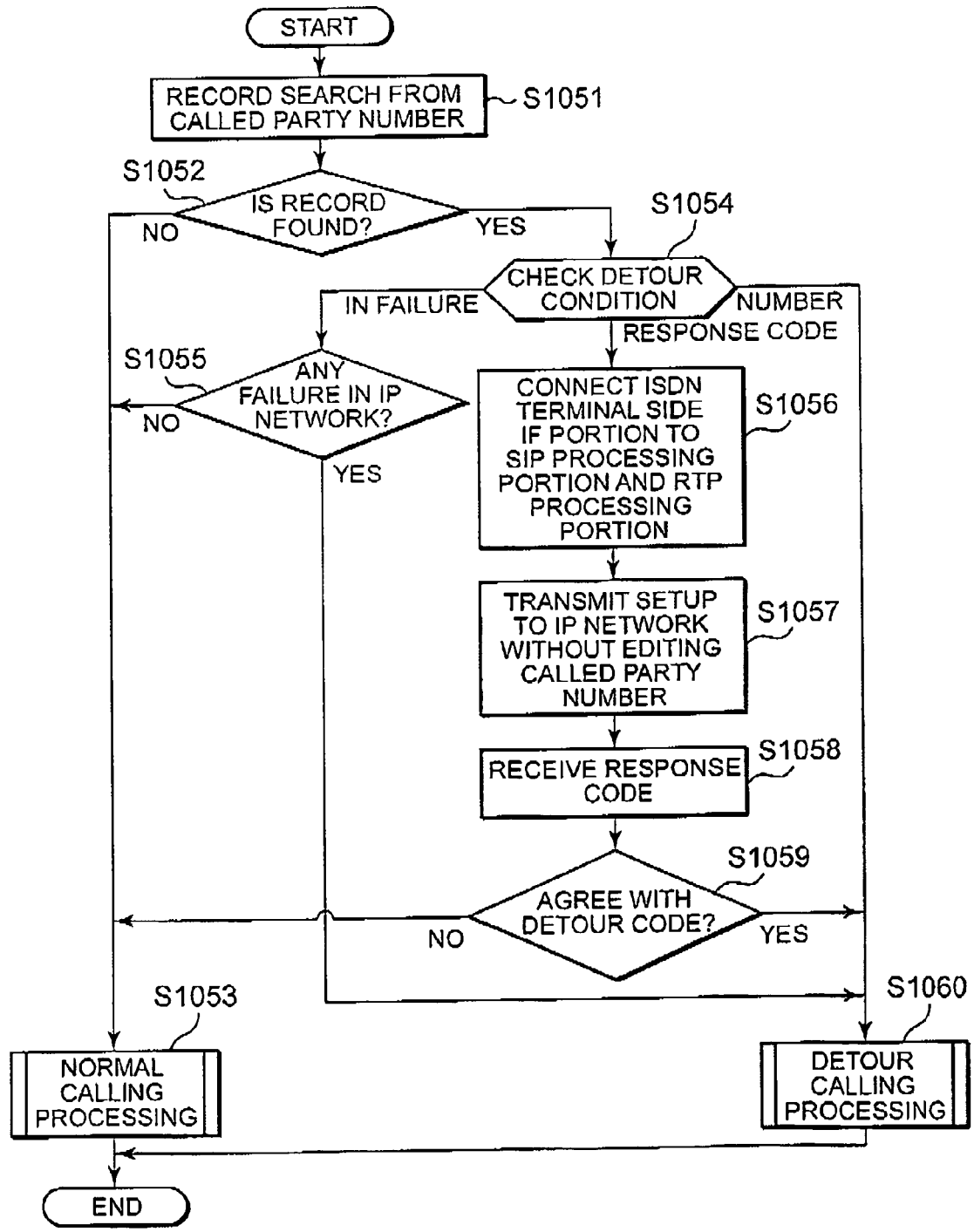
FIG. 6 is a flowchart for explaining calling control processing (S105 in FIG. 5)

FIG. 6 is a flowchart for explaining calling control processing (S105 in FIG. 5).

First of all, the detour determining portion 108 refers to the condition storage portion 109 and searches the record 1090 with the field 1091 having the called party number specified by the SETUP message received by the ISDN terminal side IF portion 101 from the ISDN terminal 2 via the ISDN D-channel (S1051). If the record is not found (No in S1052), the detour determining portion 108 performs normal calling processing, which will be described later, in liaison with the other components of the VoIP gateway apparatus 1 and establishes the call between the ISDN terminal 2 and the other party over the IP network 3 (S1053). On the other hand, if the record is found (Yes in S1052), the detour determining portion 108 checks the detour condition in the field 1092 of the record (referred to as search record) (S1054).

If the detour condition is "Number Detour" in S1054, the detour determining portion 108 performs detour calling processing, which will be described later, in liaison with the other components of the VoIP gateway apparatus 1 and establishes the call between the ISDN terminal 2 and the other party over the ISDN 4 (S1060).

If the detour condition is "Detour In Failure" in S1054, the detour determining portion 108 checks whether the IP network IF portion 102 is electrically connected to the IP network 3 or not (S1055). If the IP network IF portion 102 is not electrically connected to the IP network 3, the detour determining portion 108 determines that a failure occurs in the IP network 3 (Yes in S1055) and performs detour calling processing, which will be described later, in liaison with the other components of the VoIP gateway apparatus 1 and establishes the call between the ISDN terminal 2 and the other party over the ISDN 4 (S1060). On the other hand, if the IP network IF portion 102 is electrically connected to the IP network 3, the detour determining portion 108 determines that no failure occurs in the IP network 3 (No in S1055) and performs normal calling processing, which will be described later, in liaison with the other components of the VoIP gateway apparatus 1 and establishes the call between the ISDN terminal 2 and the other party over the IP network 3 (S1053).

If the detour condition is "Response Code Detour" in S1054, the detour determining portion 108 controls the selector 107 to switch the connection such that an ISDN D-channel signal can be exchanged between the ISDN terminal side IF portion 101 and the SIP processing portion 104 and that an ISDN B-channel signal can be exchanged between the ISDN terminal side IF portion 101 and the SIP processing portion 104 (S1056). Thus, the SIP processing portion 104 changes the SETUP message for the ISDN received from the ISDN terminal 2 through the ISDN terminal side IF portion 101 to an INVITE message for SIP without editing the called party number and transmits an SIP packet storing the INVITE message addressed to the IP address specified by the called party number to the IP network 3 through the IP network IF portion 102 (S1057). Then, the SIP processing portion 104 waits for receiving a response code from the IP network 3 through the IP network IF portion 102 (S1058). Next, the detour determining portion 108 determines whether the response code received from the IP network 3 is the record specified in the field 1092 of the search record or not. If so (Yes in S1059), the detour determining portion 108 performs the detour calling processing, which will be described later, in liaison with the other components of the VoIP gateway apparatus 1 and establishes the call between the ISDN terminal 2 and the other party over the ISDN 4 (S1060). On the other hand, if it is not the specified record (No in S1059), the detour determining portion 108 performs the normal calling processing, which will be described later, in liaison with the other components of the VoIP gateway apparatus 1 and establishes the call between the ISDN terminal 2 and the other party over the IP network 3 (S1053).

Figure 7:
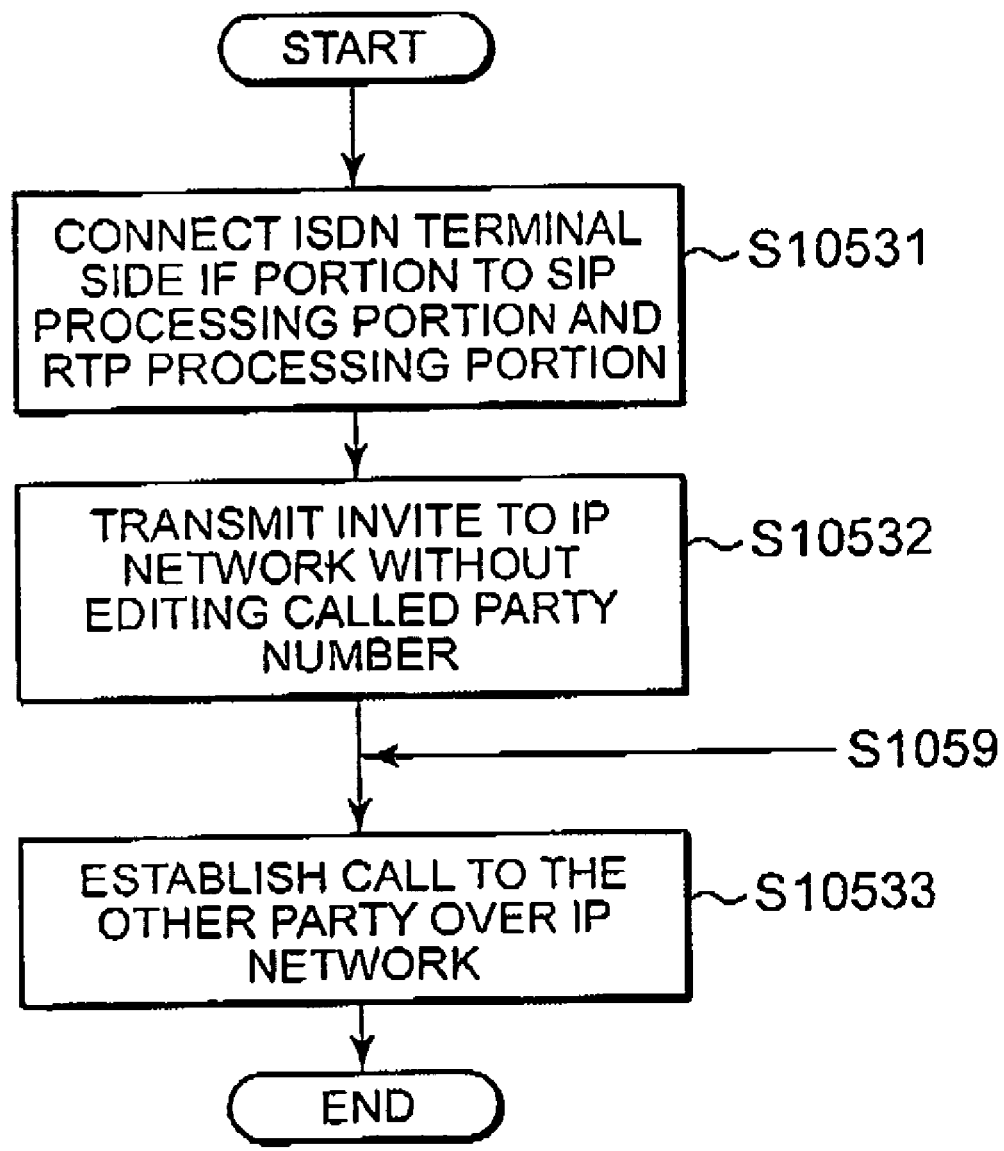
FIG. 7 is a flowchart for explaining a normal calling processing (S1053 in FIG. 6)

FIG. 7 is a flowchart for explaining the normal calling processing (S1053 in FIG. 6).

First of all, the detour determining portion 108 controls the selector 107 to switch the connection such that an ISDN D-channel signal can be exchanged between the ISDN terminal side IF portion 101 and the SIP processing portion 104 and that an ISDN B-channel signal can be exchanged between the ISDN terminal side IF portion 101 and the SIP processing portion 104 (S10531). Thus, the SIP processing portion 104 changes the SETUP message for the ISDN received from the ISDN terminal 2 through the ISDN terminal side IF portion 101 to an INVITE message for SIP without editing the called party number and transmits an SIP packet storing the INVITE message addressed to the IP address specified by the called party number to the IP network 3 through the IP network IF portion 102 (S10532). Then, the SIP processing portion 104 performs processing of exchanging a call control message stored in the ISDN D-channel to be exchanged with the ISDN terminal 2 through the ISDN terminal side IF portion 101 and a call control message stored in the SIP packet to be exchanged with the IP network 3 through the IP network side IF portion 102 and establishes the call between the ISDN terminal 2 and the IP network 3 (S10533).

Then, the SIP processing portion 104 requests the ISDN terminal side IF portion 101 for channel allocation. In response thereto, the ISDN terminal side IF portion 101 defines a B-channel to the ISDN terminal 2 to which the established call is allocated and notifies the defined B-channel to the SIP processing portion 104. The SIP processing portion 104 notifies the RTP processing portion 105 of the B-channel notified from the ISDN terminal side IF portion 101 and the IP address of the other party (VoIP terminal).

In response thereto, the RTP processing portion 105 stores, in an RTP packet, a call signal that the ISDN terminal side IF portion 101 has received via the B-channel notified by the SIP processing portion 104 and transmits the RTP packet to the IP network 3 through the IP network IF portion 102 by using the IP address notified by the SIP processing portion 104 as the address of the RTP packet. Furthermore, the RTP processing portion 105 extracts the call signal from the RTP packet received by the IP network IF portion 102 and having the IP address notified by the SIP processing portion 104, stores the call signal in the B-channel notified by the SIP processing portion and transmits the call signal through the ISDN terminal side IF portion 101. Thus, the call is enabled.

Note that, S10533 is only performed in transition to the normal calling processing (S1053 in FIG. 6) through S1059 in FIG. 6 since the processing in S10531 and S10532 has been performed already (S1056 and S1057 in FIG. 6).

Figure 8:
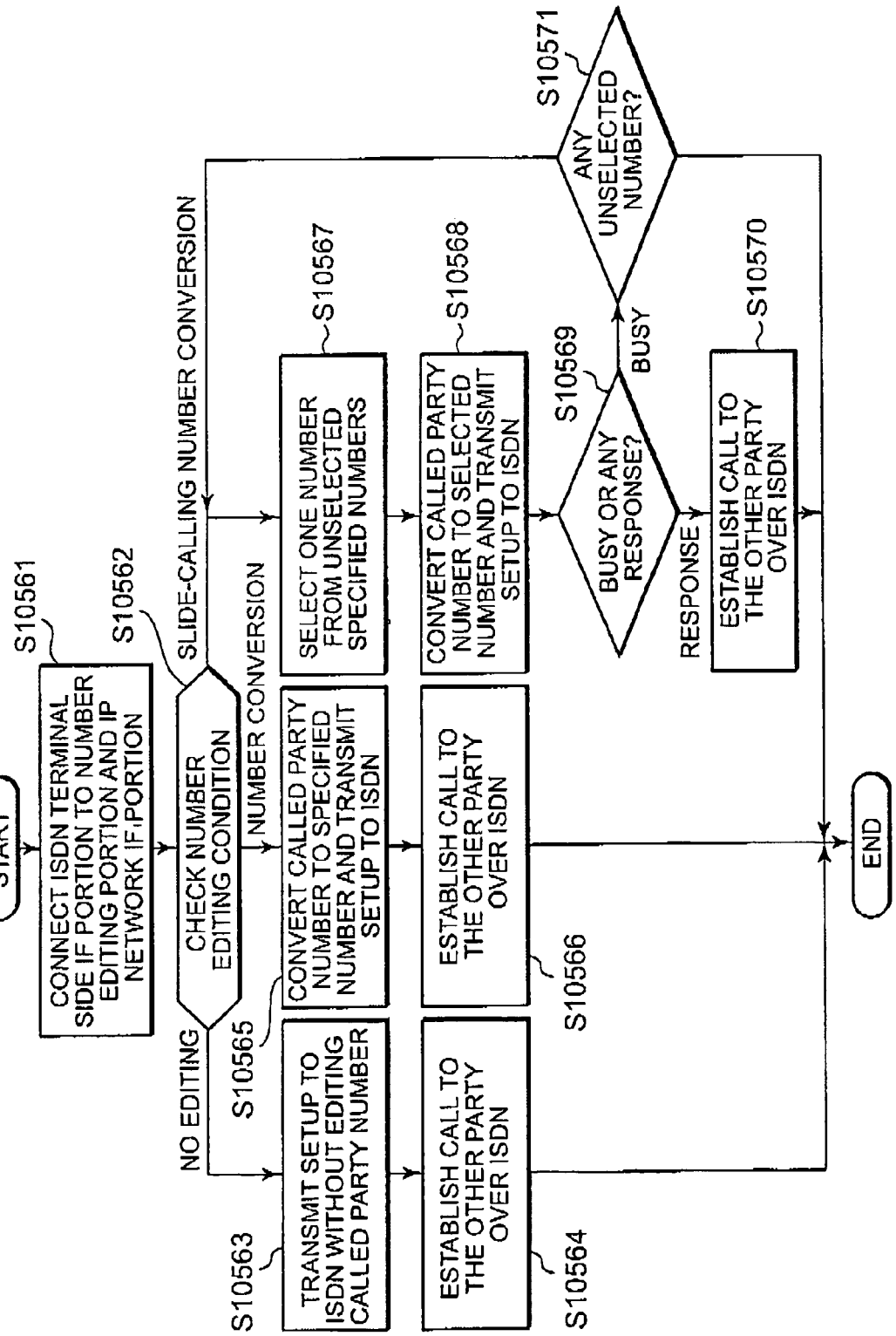
FIG. 8 is a flowchart for explaining a detour calling processing (S1060 in FIG. 6).

FIG. 8 is a flowchart for explaining the detour calling processing (S1060 in FIG. 6), First of all, the detour determining portion 108 controls the selector 107 to switch the connection such that an ISDN D-channel signal can be exchanged between the ISDN terminal side IF portion 101 and the number editing portion 106 and that an ISDN B-channel signal can be exchanged between the ISDN terminal side IF portion 101 and the ISDN network side IF portion 103 (S10561). Thus, the SETUP message that the ISDN terminal side IF portion 101 has received from the ISDN terminal 2 via the ISDN B-channel is transmitted to the number editing portion 106.

Next, the number editing portion 106 checks the number editing condition in the field 1093 of the search record searched in S1051 in FIG. 6 (S10562). If the number editing condition is "No Number Editing", the number editing portion 106 relays the SETUP message received from the ISDN terminal side IF portion 101 to the ISDN network side IF portion 103 without changing the called party number. Then, the ISDN network side IF portion 103 stores the SETUP message received from the number editing portion 106 in the ISDN D-channel and transmits the message to the ISDN 4 (S10563). Then, the number editing portion 106 relays the D-channel signal to be exchanged between the ISDN terminal side IF portion 101 and the ISDN network side IF portion 103. Thus, the call control processing is performed between the ISDN terminal 2 and the ISDN network 3, and the call is established between them (S10564). Then, the B-channel signal is exchanged between the ISDN terminal side IF portion 101 and the ISDN network side IF portion 103. Thus, the call is enabled.

If the number editing condition is "Number Conversion" in S10562, the number editing portion 106 changes the called party number of the SETUP message received from the ISDN terminal side IF portion 101 to a telephone number specified under the number editing condition and then relays the telephone number to the ISDN network side IF portion 103. Then, the ISDN network side IF portion 103 stores the SETUP message received from the number editing portion 106 in the ISDN D-channel and transmits it to the ISDN 4 (S10565). Then, the number editing portion 106 relays the D-channel signal to be exchanged between the ISDN terminal side IF portion 101 and the ISDN network side IF portion 103. Thus, the call control processing is performed between the ISDN terminal 2 and the ISDN network 3, and the call is established between them (S10566). Then, the B-channel signal is exchanged between the ISDN terminal side IF portion 101 and the ISDN network side IF portion 103. Thus, the call is enabled.

If the number editing condition is "Slide-Calling Number Conversion" in S10562, the number editing portion 106 selects one unselected telephone number within multiple telephone numbers specified under the number editing condition (S10567). Then, the number editing portion 106 changes the called party number of the SETUP message received from the ISDN terminal side IF portion 101 to the selected telephone number and then relays the selected telephone number to the ISDN network side IF portion 103. Then, the ISDN network side IF portion 103 stores the SETUP message received from the number editing portion 106 in the ISDN D-channel and transmits the message to the ISDN 4 (S10568).

Next, after the number editing portion 106 receives a response message from the ISDN 4 through the ISDN network side IF portion 103 (S10569), the number editing portion 106 relays a D-channel signal to be exchanged between the ISDN terminal side IF portion 101 and the ISDN network side IF portion 103. Thus, the call control processing is performed between the ISDN terminal 2 and the ISDN network 3, and the call is established between them (S10570). Then, the B-channel signal is exchanged between the ISDN terminal side IF portion 101 and the ISDN network side IF portion 103. Thus, the call is enabled. On the other hand, if the number editing portion 106 receives BUSY from the ISDN 4 through the ISDN network side IF portion 103 (S10569), the number editing portion 106 determines whether any unselected telephone number is available in multiple telephone numbers specified under the number editing condition or not (S10571). If so (Yes in S10571) the processing returns to S10567. On the other hand, if not (No in S10571), the flow ends.

The embodiment of the invention has been described up to this point.

According to the invention, the VoIP gateway apparatus 1 performs number editing. A call to the IP network 3 is diverted to the ISDN 4 after editing the called party number of the call to the telephone number in the numbering system for the ISDN 4. The call received from the ISDN 4 is relayed to the ISDN terminal 2 after the called party number of the call is being edited to the telephone number defined in the ISDN terminal 2. Therefore, a call received from the ISDN terminal 2 is allowed to arrive at the other party by diverting the call from the IP network 3 to the ISDN 4 even with different numbering systems between communications over the IP network 3 and over the ISDN network 4. Furthermore, the call received from the ISDN 4 can be relayed to the ISDN terminal 2 such that the ISDN terminal 2 can process the call.

It should be noted that the prensent invention is not limited to the embodiment but many changes can be made thereto without departing from the spirit and scope thereof.

For example, multiple ISDN terminal side IF portions 101 may be provided in FIG. 2, and the selector 107 may select one of the multiple ISDN terminal side IF portions 101 based on the called party number specified in the SETUP message received from the number editing portion 106 and the SIP processing portion 104 and connect between the selected ISDN terminal side IF portion 101 and the number editing portion 106 and ISDN network side IF portion 103 or between the selected ISDN terminal side IF portion 101 and the SIP processing portion 104 and RTP processing portion 105.

According to this embodiment, in order to divert the SETUP message from the ISDN terminal 2 to the ISDN 4, the number editing portion 106 gives the called party number specified in the SETUP message to the SETUP message as the subaddress of the called party number and transmits it from the ISDN network side IF portion 103 to the ISDN 4. However, the present invention is not limited thereto. The called party number specified in the SETUP message does not have to be given to the SETUP message as the subaddress of the called party number. In this case, the number editing portion 106 may convert the called party number of the SETUP message received from the ISDN 4 through the ISDN network side IF portion 103 to a pre-registered number (number defined in the ISDN terminal 2 accommodated in the VoIP gateway apparatus 1) and then transmit the SETUP message through the ISDN network side IF portion 101.

When no power is supplied to the VoIP gateway apparatus 1 due to a power failure, for example, the selector may be controlled by using backup power to connect the ISDN network side IF portion 103 and the number editing portion 106 and ISDN terminal side IF portion 101, and the number editing portion 106 may allow a signal in the D-channel to pass through.

Having described the example that an ISDN is used as an interface to an accommodated device in this embodiment, the present invention is not limited thereto. An analog interface (such as 2Wire FXS interface, 4Wire SS/SR Signaling System interface, etc.) may be adopted instead.

Having described the case that the ISDN 4 is used as a detour network, for example, in this embodiment, the invention is not limited thereto. A PSTN may be used instead of an ISDN.

Each of the configurations in the VoIP gateway apparatus 1 does not have to be implemented by executing a program by a computer. They may be implemented in hardware by an integrated logic IC such as an ASIC (Application Specific Integrated Circuit) and FPGA (Field Programmable Gate Array) or may be implemented in software by a computer such as a DSP (Digital Signal Processor).

What is claimed is:

1. A VoIP (Voice over IP) gateway apparatus which connects an accommodated device to an IP network and a detour network, the apparatus comprising:

an accommodated device interface which connects to the accommodated device;

an IP network interface which connects to the IP network;

a detour network interface which connects to the detour network;

condition storage means which stores a called party number, a detour condition and a number editing condition corresponding to each other; and calling control means which transmits a call arriving at the accommodated device interface to the IP network interface or the detour network interface, wherein;

the detour condition includes one of a first detour condition, a second detour condition, and a third detour condition; and wherein the calling control means:

when a called party number of a call arriving at the accommodated device interface encounters a condition which corresponds to the first detour condition stored in the condition storage means, edits the called party number of the call based on a corresponding number editing condition and transmits the call to the detour network via the detour network interface;

when a called party number of a call arriving at the accommodated device interface encounters a condition which corresponds to the second detour condition stored in the condition storage means, determines whether or not a failure occurs in the IP network, if a failure occurs in the IP network, edits the called party number of the call based on corresponding number editing conditions and transmits the call to the detour network via the detour network interface, and if no failure occurs in the IP network, transmits the call to the IP network via the IP network interface without editing the called party number of the call; and when a called party number of a call arriving at the accommodated device interface encounters a condition which corresponds to the third detour condition in the condition storage means, transmits the call to the IP network via the IP network interface without editing the called party number of the call, and when a response code as a predetermined response thereto is received, edits the called party number of the call based on corresponding number editing condition and transmits the call to the detour network via the detour network interface.

2. The VoIP gateway apparatus according to claim 1, wherein:

the condition storage means stores a telephone number, which is to be changed to, as the number editing condition; and when the calling control means changes the called party number of a call arriving at the accommodated device interface, the calling control means changes the called party number to a telephone number stored in the condition storage means as the number editing condition, and transmits the call from the detour network interface.

3. The VoIP gateway apparatus according to claim 2, wherein:

the calling control means repeats processing of transmitting a called party number of a call to the IP network via the IP network interface without editing the called party number of the call when the called party number of the call arriving at the accommodated device interface encounters a condition that corresponds to the third detour condition stored in the condition storage means, changing the called party number of the call to one of multiple telephone numbers included in a number editing condition corresponding to the called party number when a response code indicating that a call is busy as a response is received, and transmitting the call to the detour network via the detour network interface, until a response code indicating that a call is busy is no longer received from the detour network.

4. The VoIP gateway apparatus according to claim 2,
wherein the calling control means gives the called party number of the call arriving at the accommodated device interface to a call to be transmitted from the detour network interface, as a subaddress of the called party number.

5. A VoIP (Voice over Internet Protocol) gateway apparatus according to claim 1
wherein the calling control means:
when a call arrives at the IP network interface, transmits the call from the accommodated device interface without editing the called party number of the call; and
when a call arrives at the detour network interface, changes the called party number of the call to a telephone number defined in the accommodated device, and then transmits the call from the accommodated device interface.

6. The VoIP gateway apparatus according to claim 5,
wherein the calling control means:
when a call arrives at the detour network interface, changes the called party number of the call to a telephone number given to a subaddress of the called party number of the call, and then transmits the call from the accommodated device interface.

7. The VoIP gateway apparatus according to claim 6, the apparatus further comprising multiple accommodated device interfaces, and the multiple accommodated device interfaces respectively correspond to telephone numbers,
wherein the calling control means:
when a call arrives at the detour network interface, changes the called party number of the call to the telephone number given to a subaddress of the called party number of the call, and then transmits the call from the accommodated device interface corresponding to the telephone number.

8. The VoIP gateway apparatus according to claim 3,
wherein the calling control means gives the called party number of the call arriving at the accommodated device interface to a call to be transmitted from the detour network interface, as a subaddress of the called party number.

* * * * *